(12) United States Patent
Sako et al.

(10) Patent No.: US 10,372,088 B2
(45) Date of Patent: Aug. 6, 2019

(54) POWER CONSUMPTION MANAGEMENT DEVICE, POWER CONSUMPTION MANAGEMENT SYSTEM, POWER CONSUMPTION MANAGEMENT METHOD, AND POWER CONSUMPTION MANAGEMENT PROGRAM

(71) Applicant: Sony Corporation, Tokyo (JP)

(72) Inventors: Yoichiro Sako, Tokyo (JP); Takanori Washiro, Kanagawa (JP); Kazutoshi Serita, Tokyo (JP); Taro Tadano, Chiba (JP); Kazuyoshi Takemura, Tokyo (JP); Kuniya Hayashi, Tokyo (JP); Kayoko Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 534 days.

(21) Appl. No.: 13/934,572

(22) Filed: Jul. 3, 2013

(65) Prior Publication Data

US 2014/0018967 A1    Jan. 16, 2014

(30) Foreign Application Priority Data

Jul. 11, 2012  (JP) ................. 2012-155116

(51) Int. Cl.
*G05B 13/02* (2006.01)
*H02J 13/00* (2006.01)
(Continued)

(52) U.S. Cl.
CPC .......... *G05B 13/02* (2013.01); *H02J 13/0006* (2013.01); *H02J 3/14* (2013.01);
(Continued)

(58) Field of Classification Search
CPC ........ G06Q 50/06; H02J 3/14; H02J 13/0006; H02J 2003/003; Y02B 70/3225;
(Continued)

(56) References Cited

U.S. PATENT DOCUMENTS

| 4,253,151 A | * | 2/1981 | Bouve | ................ G01R 21/1338 324/116 |
| 2005/0135819 A1 | * | 6/2005 | Ahn | .................... G03G 15/0856 399/27 |

(Continued)

FOREIGN PATENT DOCUMENTS

JP          10-282161          10/1998

*Primary Examiner* — Robert E Fennema
*Assistant Examiner* — Jigneshkumar C Patel
(74) *Attorney, Agent, or Firm* — K&L Gates LLP (57) ABSTRACT

There is provided a power consumption management device including a power measurement unit configured to measure power consumption of an electrical device, an environmental factor measurement unit configured to measure a factor of an environment in which the electrical device is used, a storage unit configured to store a predicted value related to the power consumption in which a value of the factor of the environment is designated as a parameter, and a calculation/control unit. The calculation/control unit obtains the predicted value related to the power consumption stored in the storage unit based on the value of the factor of the environment measured by the environmental factor measurement unit and compares the obtained predicted value related to the power consumption to an actual measurement value related to the power consumption obtained based on a power consumption value measured by the power measurement unit.

18 Claims, 3 Drawing Sheets

(51) Int. Cl.
*H02J 3/14* (2006.01)
*H02J 3/00* (2006.01)

(52) U.S. Cl.
CPC ..... *H02J 2003/003* (2013.01); *Y02B 70/3266* (2013.01); *Y02E 60/74* (2013.01); *Y04S 10/30* (2013.01); *Y04S 20/242* (2013.01)

(58) Field of Classification Search
CPC ..... Y02B 70/3266; G05B 13/02; Y02E 60/74; Y04S 10/30; Y04S 10/54; Y04S 20/242
USPC ........................................................ 700/291
See application file for complete search history.

(56) References Cited

U.S. PATENT DOCUMENTS

| | | | |
|---|---|---|---|
| 2008/0120080 A1* | 5/2008 | Nasle | G05B 17/02 703/13 |
| 2009/0231320 A1* | 9/2009 | Kumakura | G09G 3/293 345/212 |
| 2009/0327785 A1* | 12/2009 | Chang | G06F 1/3203 713/340 |
| 2010/0141777 A1* | 6/2010 | Jin | G06F 1/3218 348/189 |
| 2011/0153103 A1* | 6/2011 | Brown | G06Q 10/04 700/291 |
| 2013/0002020 A1* | 1/2013 | Hyde | H02J 3/14 307/39 |
| 2013/0073507 A1* | 3/2013 | Sera | B60L 11/1861 706/46 |
| 2013/0131883 A1* | 5/2013 | Yamada | H02J 3/14 700/295 |
| 2013/0268136 A1* | 10/2013 | Cox | H02J 3/14 700/295 |

* cited by examiner

POWER CONSUMPTION MANAGEMENT DEVICE, POWER CONSUMPTION MANAGEMENT SYSTEM, POWER CONSUMPTION MANAGEMENT METHOD, AND POWER CONSUMPTION MANAGEMENT PROGRAM

CROSS REFERENCES TO RELATED APPLICATIONS

The present application claims priority to Japanese Priority Patent Application JP 2012-155116 filed in the Japan Patent Office on Jul. 11, 2012, the entire content of which is hereby incorporated by reference.

BACKGROUND

The present disclosure relates to a power consumption management device, a power consumption management system, a power consumption management method, and a power consumption management program.

It is very important for a user of an electrical device or the like to recognize how much the electrical device actually consumes power in order to take energy-saving measures. In addition, power consumption is increased due to the occurrence of aging degradation or a failure or the addition of an excessive load according to an electrical device. A power consumption monitoring system for monitoring the above-described increase in the power consumption, for example, is well known from Japanese Unexamined Patent Application Publication No. H10-282161. The power consumption monitoring system includes one or more electrical devices, one or more monitoring units configured to measure and monitor power consumption of the electrical devices, and a reporting unit configured to receive and report a report signal from the monitoring unit, wherein the monitoring unit transmits the report signal to the reporting unit when individual power consumption or a total amount exceeds a predetermined value.

SUMMARY

In the technology disclosed in Japanese Unexamined Patent Application Publication No. H10-282161 described above, the monitoring unit monitors whether the individual power consumption or the total amount exceeds the predetermined value. Here, the predetermined value is a fixed value. However, for example, it is often desirable to change the predetermined value in summer and winter or change the predetermined value depending upon an ambient temperature to optimize the predetermined value according to an electrical device.

It is desirable to provide a power consumption management device, a power consumption management system, a power consumption management method, and a power consumption management program capable of monitoring power consumption of an electrical device with higher precision.

According to an embodiment of the present disclosure, there is provided a power consumption management device including a power measurement unit configured to measure power consumption of an electrical device, an environmental factor measurement unit configured to measure a factor of an environment in which the electrical device is used, a storage unit configured to store a predicted value related to the power consumption in which a value of the factor of the environment is designated as a parameter, and a calculation/control unit. The calculation/control unit may obtain the predicted value related to the power consumption stored in the storage unit based on the value of the factor of the environment measured by the environmental factor measurement unit and compares the obtained predicted value related to the power consumption to an actual measurement value related to the power consumption obtained based on a power consumption value measured by the power measurement unit.

According to an embodiment of the present disclosure, there is provided a power consumption management system including a plurality of power consumption management devices, each of which includes a power measurement unit configured to measure power consumption of an electrical device, and an environmental factor measurement unit configured to measure a factor of an environment in which the electrical device is used, and a computer configured to be connected to each power consumption management device via a communication line and include a storage unit and a calculation/control unit. The calculation/control unit may obtain a predicted value related to the power consumption stored in a storage unit based on a value of the factor of the environment measured by the environmental factor measurement unit of each power consumption management device, compares the obtained predicted value related to the power consumption to an actual measurement value related to the power consumption obtained based on a power consumption value measured by the power measurement unit of the power consumption management device, and transmits a comparison result to the power consumption management device via the communication line. The result of comparison may be sent to the power consumption management devices via the communication line, displayed by a display device connected to a computer, or displayed on a website on the internet.

According to an embodiment of the present disclosure, there is provided a power consumption management method including storing a predicted value related to power consumption in which a value of a factor of an environment is designated as a parameter in a storage unit, and obtaining the predicted value related to the power consumption stored in the storage unit based on a measurement result of the factor of the environment in which an electrical device is used and comparing the obtained predicted value related to the power consumption to an actual measurement value related to the power consumption obtained based on a power consumption measurement result of the electrical device.

According to an embodiment of the present disclosure, there is provided a power consumption management program including storing a predicted value related to power consumption in which a value of a factor of an environment is designated as a parameter in a storage unit, and obtaining the predicted value related to the power consumption stored in the storage unit based on a measurement result of the factor of the environment in which an electrical device is used and comparing the obtained predicted value related to the power consumption to an actual measurement value related to the power consumption obtained based on a power consumption measurement result of the electrical device.

According to the embodiments of the present disclosure described above, in the power consumption management device, the power consumption management system, the power consumption management method, and the power consumption management program, it is possible to monitor power consumption of an electrical device with higher precision and accurately recognize the defect occurrence or aging change of an electrical device because a predicted value related to power consumption stored in a storage unit is obtained based on a value of a factor of an environment measured by an environmental factor measurement unit and the obtained predicted value related to the power consumption is compared to an actual measurement value related to the power consumption obtained based on a power consumption value measured by a power measurement unit without merely monitoring whether individual power consumption or a total amount exceeds a predetermined value having a fixed value.

Additional features and advantages are described herein, and will be apparent from the following Detailed Description and the figures.

DETAILED DESCRIPTION

While the present disclosure will be described based on embodiments with reference to the drawings hereinafter, the present disclosure is not limited to the embodiments, and various numerical values or materials in the embodiments are merely shown as an example. Furthermore, description will be given in the following order.

1. General description of power consumption management device, power consumption management system, power consumption management method, and power consumption management program of present disclosure 2. Embodiment 1 (power consumption management device, power consumption management method, and power consumption management program of present disclosure)

3. Embodiment 2 (modification of embodiment 1)

4. Embodiment 3 (other modification of embodiment 1 and power consumption management system of present disclosure)

5. Embodiment 4 (modifications of embodiments 1 to 3) and others

General Description of Power Consumption Management Device, Power Consumption Management System, Power Consumption Management Method, and Power Consumption Management Program of Present Disclosure When a value of [(Actual measurement value related to power consumption)−(Predicted value related to power consumption)] is in a prescribed range in the power consumption management device according to an embodiment of the present disclosure, a calculation/control unit can be formed to store the actual measurement value related to the power consumption as the predicted value related to the power consumption in a storage unit by designating a value of a factor of an environment measured by an environmental factor measurement unit as a parameter (specifically, formed to average an original predicted value and the actual measurement value and store an average value as a new predicted value; this is also the same hereinafter). In addition, when the value of [(Actual measurement value related to power consumption)−(Predicted value related to power consumption)] is in the prescribed range in the power consumption management method or the power consumption management program according to an embodiment of the present disclosure, the actual measurement value related to the power consumption can be formed to be stored as the predicted value related to the power consumption in the storage unit by designating the value of the factor of the environment measured by an environmental factor measurement unit as the parameter. Thereby, it is possible to perform renormalization for a population of predicted values related to the power consumption and improve the accuracy of the predicted value related to the power consumption or the like. Here, although the prescribed range is not limited, a value $2\sigma$ twice the standard deviation $\sigma$ of the predicted value related to the power consumption can be shown as an example. This can also be substantially the same hereinafter.

On the other hand, when the value of [(Actual measurement value related to power consumption)−(Predicted value related to power consumption)] is in the prescribed range in the power consumption management system according to an embodiment of the present disclosure, the calculation/control unit can be formed to store the actual measurement value related to the power consumption as the predicted value related to the power consumption in the storage unit by designating the value of the factor of the environment measured by the electrical device and the environmental factor measurement unit as the parameter. Thereby, it is possible to perform renormalization for a population of predicted values related to the power consumption and improve the accuracy of the predicted value related to the power consumption or the like.

In the power consumption management device or the power consumption management system according to an embodiment of the present disclosure including the above-described preferred form, the calculation/control unit can be formed to issue a warning when the value of [(Actual measurement value related to power consumption)−(Predicted value related to power consumption)] is out of the prescribed range. In addition, in the power consumption management method or the power consumption management program according to an embodiment of the present disclosure including the above-described preferred embodiment, the warning can be formed to be issued when the value of [(Actual measurement value related to power consumption)−(Predicted value related to power consumption)] is out of the prescribed range. Specifically, when the value of [(Actual measurement value related to power consumption)−(Predicted value related to power consumption)] is out of the prescribed range, a warning indicating that a defect or failure has occurred in an electrical device or that an excessive load has been added can be issued based on a sound and an image or a video.

Furthermore, in the power consumption management device or the power consumption management system according to embodiments of the present disclosure including various preferred forms described above, the calculation/control unit can be formed to store an actual measurement value related to power consumption in the storage unit, obtain a change amount between actual measurement values related to the power consumption before and after an elapse of a predetermined time, and issue a warning when the change amount is greater than or equal to a predetermined value. In addition, in the power consumption management method or the power consumption management program according to embodiments of the present disclosure including various preferred forms described above, the actual measurement value related to the power consumption can be formed to be stored in the storage unit, the change amount between the actual measurement values related to the power consumption before and after an elapse of the predetermined time can be obtained, and the warning can be formed to be issued when the change amount is greater than or equal to the predetermined value. Specifically, when the change amount is greater than or equal to the predetermined value, the change amount also depends upon a length of the predetermined time, but the warning indicating that aging degradation has occurred in an electrical device can be issued based on the sound and the image or the video. The warning indicating that the defect or failure has occurred in the electrical device or that the excessive load has been added can be issued based on the sound and the image or the video. It is only necessary to appropriately determine the "predetermined time" according to an electrical device or according to which state is known such as whether aging degradation has occurred in an electrical device, whether a defect or failure has occurred in an electrical device, or whether an excessive load has been added.

Furthermore, in the power consumption management device, the power consumption management system, the power consumption management method, or the power consumption management program according to embodiments of the present disclosure including various preferred forms described above, the factor of the environment can be formed to be at least a temperature. That is, the factor of the environment can be formed to be a temperature (for example, an ambient temperature) and can be formed to be at least one type of environmental factor selected from the group including a temperature, a humidity, a water temperature, and an amount of content within an electrical device. It is only necessary for the environmental factor measurement unit to be a device capable of appropriately measuring the factor of the environment. For example, when the factor of the environment is the temperature, the humidity, the water temperature, or the amount of content within the electrical device, it is only necessary to include a temperature sensor, a humidity sensor, a water temperature sensor, or an integrated circuit (IC) tag, a mass sensor, or a pressure sensor attached to content within the electrical device in the environmental factor measurement unit.

Furthermore, the power consumption management device, the power consumption management system, the power consumption management method, or the power consumption management program according to embodiments of the present disclosure including various preferred forms described above can have:

a configuration in which the predicted value related to the power consumption is a predicted value of average power consumption, and the actual measurement value related to the power consumption is an actual measurement value of the average power consumption, a configuration in which the predicted value related to the power consumption is a predicted value of a peak level of the power consumption, and the actual measurement value related to the power consumption is an actual measurement value of the peak level of the power consumption, a configuration in which the predicted value related to the power consumption is a predicted value of a peak integration value of the power consumption, and the actual measurement value related to the power consumption is an actual measurement value of the peak integration value of the power consumption, or a configuration in which the predicted value related to the power consumption is a predicted value of the number of peak occurrences of power consumption per unit time, and the actual measurement value related to the power consumption is an actual measurement value of the number of peak occurrences of power consumption per unit time. Here, it is only necessary to determine a configuration to be adopted based on the electrical device.

For example, it is only necessary for a manufacturer of an electrical device to create a predicted value related to power consumption or an initial value of the predicted value related to the power consumption in a type of database. Furthermore, a type of database is constructed for the predicted value related to power consumption by designating a value of the factor of the environment as a parameter. At this time, it is desirable to construct a database by adding an operating mode (for example, a power saving mode, a sleep mode, an energy saving mode, or the like), a driving or operating condition of the electrical device (for example, a set temperature or strength of an operation of the electrical device, or the like), and season/month/day of month/day of week/time, or the like.

Furthermore, in the power consumption management device according to embodiments of the present disclosure including various preferred forms and configurations described above, the power measurement unit, the environmental factor measurement unit, the storage unit, and the calculation/control unit can be configured to be arranged in an electrical device or in the vicinity thereof. Alternatively, the power measurement unit, the environmental factor measurement unit, and the calculation/control unit can be configured to be arranged in an electrical device or in the vicinity thereof and the storage unit can be configured to be arranged inside a computer connected via a communication line. Alternatively, the power measurement unit and the environmental factor measurement unit can be configured to be arranged in an electrical device or in the vicinity thereof, and the storage unit and the calculation/control unit can configured to be arranged inside a computer connected via a communication line. In addition, in the power consumption management system according to embodiments of the present disclosure including various preferred forms and configurations described above, the power measurement unit and the environmental factor measurement unit can be configured to be arranged in an electrical device or in the vicinity thereof. The computer connected via the communication line can specifically include a server connected to the Internet or a so-called cloud computer. In addition, it is desirable to connect the power consumption management device to the Internet from the viewpoint of the reception and exchange of various information or data.

Furthermore, in the power consumption management device, the power consumption management system, the power consumption management method, or the power consumption management program according to embodiments of the present disclosure including various preferred forms and configurations described above, an example of an electrical device (including electronic device) is an electrical device which constantly operates such as a refrigerator or a freezer; an electrical device which operates for a long time such as an air conditioner, a ventilation fan, a fan, or a heater; an electrical device which operates for at least several hours such as a personal computer, a television receiver, audio equipment, a video recorder, a rice cooker, a hot-water kettle, an electric kettle, a coffee maker, a battery charger of a portable phone, or a secondary battery charger in an electric vehicle; an electrical device which operates for about one hour such as a washing machine, a clothes dryer, a dishwasher, a vacuum cleaner, a hot plate, or a grill pan; or an electrical device which operates for several minutes to several tens of minutes such as a hair dryer, a microwave oven, an oven, or various printers. For example, a power consumption amount is rapidly increased when a compressor starts up in the refrigerator, the freezer, and the air conditioner, and the power consumption amount is rapidly increased when a print operation starts up in a laser printer. In addition, the power consumption amount largely fluctuates according to soaking, washing, rinsing, spinning, or the like in the washing machine. On the other hand, for example, the fluctuation of the power consumption amount is small in the personal computer. In addition, although the fluctuation of the power consumption amount is also small in the television receiver, the audio equipment, the video recorder, and the like, for example, the power consumption is increased when a volume is increased.

It is only necessary to compare the predicted value related to the power consumption to the actual measurement value related to the power consumption when the value of the factor of the environment is changed above a predetermined value or when the operating mode of the electrical device or the driving or operating condition of the electrical device is changed. That is, it is only necessary to compare the predicted value related to the power consumption to the actual measurement value related to the power consumption when a parameter is changed in the predicted value related to the power consumption for which a database has been constructed.

An example of the power measurement unit is a power meter or a power supply outlet, a power supply tap, or the like having a power measurement function, a control function, and a communication function (specifically, an outlet type, a table tap type, an expansion adapter type, or the like). The storage unit can include a well-known storage device, and the calculation/control unit, for example, can include a combination of a central processing unit (CPU) and a storage unit (a memory or the like). It is preferable for the power consumption management device to include a communication device, if necessary. When the power measurement unit or the like is arranged in the vicinity of an electrical device as described above, the power measurement unit or the like is arranged in an ampere breaker, a switchboard, a power router, or an energy server (hereinafter, these are collectively referred to as an "ampere breaker or the like"), arranged in a power supply outlet, a power supply tap, or the like (hereinafter, these are collectively referred to as a "power supply tap or the like"), arranged between the ampere breaker or the like and the power supply tap or the like, arranged between the power supply tap or the like and the electrical device or the like, or arranged between the ampere breaker or the like and the electrical device. The predicted value related to the power consumption stored in the storage unit of the computer connected via the communication line may be provided for review by the third party. Specifically, the predicted value related to the power consumption may be published on a webpage and a homepage on the Internet. The communication also includes power line communication (PLC) technology as well as communication using a wireless link, a communication line, and a public line. When a plurality of electrical devices are connected to one power consumption management device, it is desirable that the power consumption management device include a plurality of power measurement units and environmental factor measurement units, measure power consumption of each piece of the electrical device, and measure a factor of an environment in which the electrical device is used.

A form of power supply for an electrical device can include power supply via an electricity distribution line (including an electricity transmission line or a cable). An electricity distribution network configuration system can include a spot network system, a regular network system (low-voltage network system), a low-voltage banking system, a main line-spare line system (cyclic system), a dendritic system (radial system), and the like. In addition, the electricity distribution line includes a high-voltage electricity distribution line (an electricity distribution line that is an overhead electric line for a residential area or the like and is generally used as an incoming line which is greater than 50 kVA and less than or equal to 2000 kVA) and a low-voltage electricity distribution line (an electricity distribution line that is generally used as an incoming line which is less than or equal to 50 kVA for single-family houses or the like).

Embodiment 1

Figure 1:
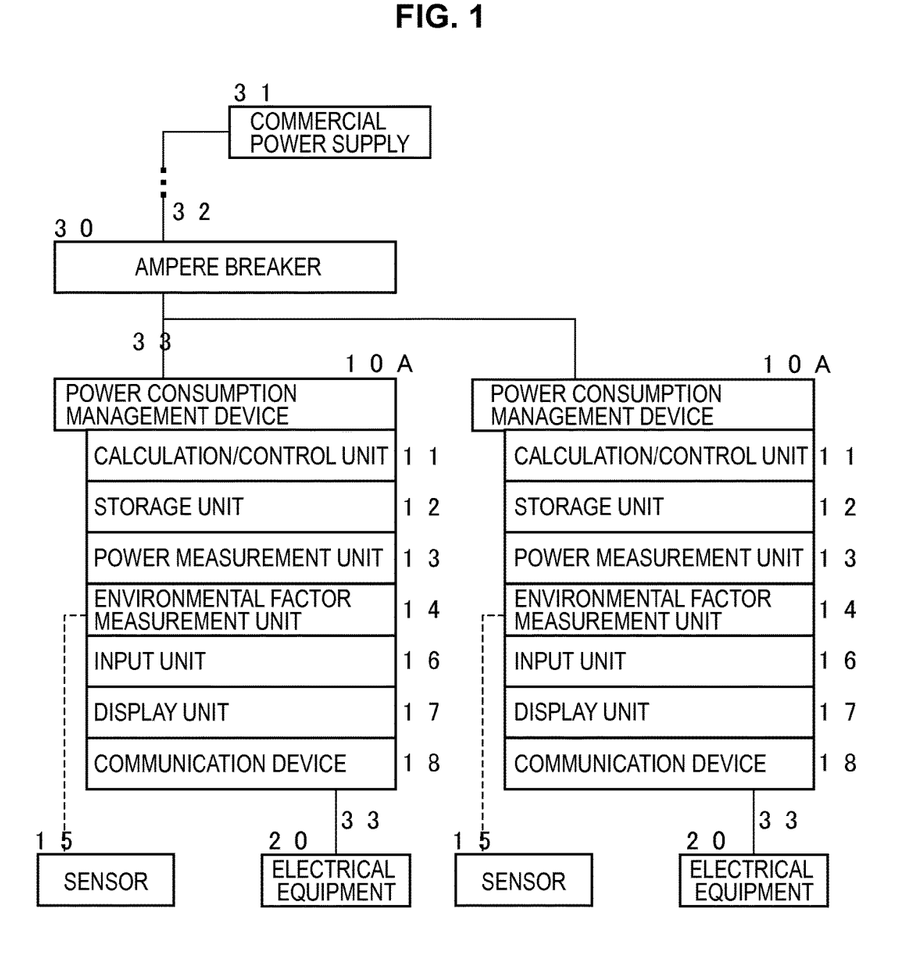
FIG. 1 is a conceptual diagram of a power consumption management device of an embodiment 1.

The embodiment 1 relates to the power consumption management device, the power consumption management method, and the power consumption management program of the present disclosure. The power consumption management device 10A of the embodiment 1 illustrated in the conceptual diagram of FIG. 1 includes:

a power measurement unit 13 configured to measure power consumption of an electrical device (specifically, for example, an air conditioner) 20;

an environmental factor measurement unit 14 configured to measure a factor of an environment in which the electrical device 20 is used;

a storage unit 12 configured to store a predicted value related to the power consumption in which a value of the factor of the environment is designated as a parameter; and a calculation/control unit 11.

Here, the power consumption management device 10A is a table tap type having a power measurement function and a control function, includes the power measurement unit 13, the environmental factor measurement unit 14, the storage unit 12, and the calculation/control unit 11 in a built-in type, and further includes an input unit 16, a display unit 17, and a communication device 18. The storage unit 12 includes a well-known storage device, and the calculation/control unit 11, for example, includes a combination of a CPU and a storage unit (a memory or the like). The factor of the environment is at least a temperature (specifically, an ambient temperature in the embodiment), and the environmental factor measurement unit 14 includes a temperature measuring instrument with a temperature sensor 15. The power consumption management device 10A is arranged between the ampere breaker 30 and the electrical device 20 via a wiring 33. Power is supplied from a commercial power supply 31 to the electrical device 20 via an electricity distribution line 32, an ampere breaker 30, the wiring 33, and the power consumption management device 10A.

Furthermore, the power consumption management device 10A may be arranged within the ampere breaker 30, and embedded in the electrical device 20. Alternatively, the power consumption management device 10A may be arranged between the ampere breaker or the like and the power supply tap or the like (not illustrated), or arranged between the power supply tap or the like and the electrical device.

Then, the calculation/control unit 11 obtains the predicted value (specifically, a predicted value of a power amount in the embodiment) related to the power consumption stored in the storage unit 12 based on the environmental factor value (specifically, an ambient temperature in the embodiment) measured by the environmental factor measurement unit 14 and compares the obtained predicted value related to the power consumption to the actual measurement value (an actual measurement value of a power amount) related to the power consumption obtained based on the power consumption value measured by the power measurement unit 13. Here, the predicted value related to the power consumption (or an initial value of the predicted value related to the power consumption) is stored in a type of database in which the factor of the environment is designated as the parameter as shown in the following table, and is created by a manufacturer of the electrical device 20. Furthermore, the database is constructed by adding an operating mode (which is, for example, a power saving mode, a sleep mode, an energy saving mode, or the like and denoted by $A_0$ or $A_1$ in the table) of the electrical device 20, a driving or operating condition of the electrical device 20 (which is, for example, a set temperature or strength of the electrical device 20, or the like and denoted by $B_0$ or $B_1$ in the table), and a season/month/day of month/day of week/time, or the like (denoted by $C_0$ or $C_1$ in the table). Furthermore, $T_0 < T_2 < T_3 < T_4 < T_5$ is given.

Furthermore, it is only necessary that the calculation/control unit 11 receiving various information related to the electrical device 20 (for example, a model number or the like of the electrical device 20) from the electrical device 20 via the wiring 33 and the communication device 18, for example, based on the PLC technology, for example, access a homepage of the manufacturer of the electrical device 20 via the communication device 18 and the electricity distribution line 32 based on the PLC technology, download the predicted value related to the power consumption, and store the downloaded predicted value in the storage unit 12. Alternatively, the predicted value related to the power consumption may be input from the input unit 16.

pared to the actual measurement value related to the power consumption obtained based on a power consumption measurement result of the electrical device 20.

Specifically, for example, a value of the factor (ambient temperature) of the environment measured by the environmental factor measurement unit 14 is assumed to be greater than or equal to $T_1°$ C. and less than $T_2°$ C. In addition, the calculation/control unit 11, for example, is assumed to receive an operating mode $A_0$ and a driving or operating condition $B_0$ related to the electrical device 20 via the wiring 33 based on the PLC technology. Furthermore, it is possible to know data $C_0$ of the season/month/day of month/day of week/time through a timing device embedded in the power consumption management device 10A. The calculation/control unit 11 can obtain $PC_{01}$ (kW·hr) as the predicted value (a predicted value of a power amount) related to the power consumption from the database stored in the storage unit 12 based on the above-described information (the value greater than or equal to $T_1°$ C. and less than $T_2°$ C./$A_0$/$B_0$/$C_0$). On the other hand, it is possible to obtain an actual measurement value (an actual measurement value of a power amount) $PC'_A$ related to the power consumption obtained based on a power consumption value from the power measurement unit 13. Then, the calculation/control unit 11 compares the predicted value $PC_{01}$ of the power amount to the actual measurement value $PC'_A$ of the power amount. Specifically, $\Delta PC$ is obtained as follows.

$$\Delta PC = [(\text{Actual measurement value related to power consumption}) - (\text{Predicted value related to power consumption})] = PC'_A - PC_{01}$$

Furthermore, it is only necessary to compare the predicted value related to the power consumption to the actual mea-

| Environmental factor value (ambient temperature) | Operating mode | Driving condition | Season, etc. | Predicted value related to power consumption | Prescribed range |
|---|---|---|---|---|---|
| Greater than or equal to $T_0°$ C. and less than $T_1°$ C. | $A_0$ | $B_0$ | $C_0$ | $PC_{00}$ (kW·hr) | $\Delta PC_{00}$ |
| Greater than or equal to $T_1°$ C. and less than $T_2°$ C. | $A_0$ | $B_0$ | $C_0$ | $PC_{01}$ (kW·hr) | $\Delta PC_{01}$ |
| Greater than or equal to $T_2°$ C. and less than $T_3°$ C. | $A_0$ | $B_0$ | $C_0$ | $PC_{02}$ (kW·hr) | $\Delta PC_{02}$ |
| Greater than or equal to $T_3°$ C. and less than $T_4°$ C. | $A_0$ | $B_0$ | $C_0$ | $PC_{03}$ (kW·hr) | $\Delta PC_{03}$ |
| Greater than or equal to $T_4°$ C. and less than $T_5°$ C. | $A_0$ | $B_0$ | $C_0$ | $PC_{04}$ (kW·hr) | $\Delta PC_{04}$ |
| Greater than or equal to $T_0°$ C. and less than $T_1°$ C. | $A_1$ | $B_0$ | $C_0$ | $PC_{10}$ (kW·hr) | $\Delta PC_{10}$ |
| Greater than or equal to $T_1°$ C. and less than $T_2°$ C. | $A_1$ | $B_0$ | $C_0$ | $PC_{11}$ (kW·hr) | $\Delta PC_{11}$ |
| Greater than or equal to $T_2°$ C. and less than $T_3°$ C. | $A_1$ | $B_0$ | $C_0$ | $PC_{12}$ (kW·hr) | $\Delta PC_{12}$ |
| Greater than or equal to $T_3°$ C. and less than $T_4°$ C. | $A_1$ | $B_0$ | $C_0$ | $PC_{13}$ (kW·hr) | $\Delta PC_{13}$ |
| Greater than or equal to $T_4°$ C. and less than $T_5°$ C. | $A_1$ | $B_0$ | $C_0$ | $PC_{14}$ (kW·hr) | $\Delta PC_{14}$ |
| Greater than or equal to $T_0°$ C. and less than $T_1°$ C. | $A_0$ | $B_1$ | $C_0$ | $PC_{20}$ (kW·hr) | $\Delta PC_{20}$ |
| Greater than or equal to $T_1°$ C. and less than $T_2°$ C. | $A_0$ | $B_1$ | $C_0$ | $PC_{21}$ (kW·hr) | $\Delta PC_{21}$ |
| Greater than or equal to $T_2°$ C. and less than $T_3°$ C. | $A_0$ | $B_1$ | $C_0$ | $PC_{22}$ (kW·hr) | $\Delta PC_{22}$ |
| Greater than or equal to $T_3°$ C. and less than $T_4°$ C. | $A_0$ | $B_1$ | $C_0$ | $PC_{23}$ (kW·hr) | $\Delta PC_{23}$ |
| Greater than or equal to $T_4°$ C. and less than $T_5°$ C. | $A_0$ | $B_1$ | $C_0$ | $PC_{24}$ (kW·hr) | $\Delta PC_{24}$ |
| Greater than or equal to $T_0°$ C. and less than $T_1°$ C. | $A_0$ | $B_1$ | $C_1$ | $PC_{30}$ (kW·hr) | $\Delta PC_{30}$ |
| Greater than or equal to $T_1°$ C. and less than $T_2°$ C. | $A_0$ | $B_1$ | $C_1$ | $PC_{31}$ (kW·hr) | $\Delta PC_{31}$ |
| Greater than or equal to $T_2°$ C. and less than $T_3°$ C. | $A_0$ | $B_1$ | $C_1$ | $PC_{32}$ (kW·hr) | $\Delta PC_{32}$ |
| Greater than or equal to $T_3°$ C. and less than $T_4°$ C. | $A_0$ | $B_1$ | $C_1$ | $PC_{33}$ (kW·hr) | $\Delta PC_{33}$ |
| Greater than or equal to $T_4°$ C. and less than $T_5°$ C. | $A_0$ | $B_1$ | $C_1$ | $PC_{34}$ (kW·hr) | $\Delta PC_{34}$ |

Then, in the power consumption management method or the power consumption management program of the embodiment 1, the predicted value related to the power consumption in which the value of the factor of the environment is designated as the parameter is stored in the storage unit 12, the predicted value related to the power consumption stored in the storage unit 12 is obtained based on a measurement result of the factor of the environment in which the electrical device 20 is used, and the obtained predicted value related to the power consumption is compared to the actual measurement value related to the power consumption when the value of the factor of the environment has been changed to exceed a predetermined value or when the operating mode of the electrical device or the driving or operating condition of the electrical device has been changed. That is, it is only necessary to compare the predicted value related to the power consumption to the actual measurement value related to the power consumption when the parameter has been changed in the predicted value related to the power consumption for which the database has been constructed. Then, when the value of ΔPC is out of a prescribed range $\Delta PC_{01}$, the calculation/control unit 11 issues a warning. Specifically, it is only necessary for the display unit 17 to issue the warning indicating that a defect or failure has occurred in the electrical device 20 or that an excessive load has been added thereto based on a sound and an image or a video. For example, it is only necessary for the prescribed range $\Delta PC_{01}$ to be a value (2σ) twice the standard deviation σ of the value of the predicted value $PC_{01}$ related to the power consumption.

The predicted value related to the power consumption may be designated as a predicted value of average power consumption and the actual measurement value related to the power consumption may be designated as an actual measurement value of the average power consumption. Alternatively, because a power consumption amount is rapidly increased when a compressor starts up if the electrical device 20 is an air conditioner, the predicted value related to the power consumption may be a predicted value of a peak level of the power consumption and the actual measurement value related to the power consumption may be an actual measurement value of the peak level of the power consumption. Alternatively, the predicted value related to the power consumption may be a predicted value of a peak integration value of the power consumption, and the actual measurement value related to the power consumption may be an actual measurement value of the peak integration value of the power consumption. Alternatively, the predicted value related to the power consumption may be a predicted value of the number of peak occurrences of power consumption per unit time, and the actual measurement value related to the power consumption may be an actual measurement value of the number of peak occurrences of the power consumption per unit time. Here, it is only necessary to determine a configuration to be adopted based on the electrical device 20.

In addition, the calculation/control unit 11 can be formed to store an actual measurement value related to power consumption in the storage unit 12, obtain a change amount $PC'_B/PC'_A$ between actual measurement values $PC'_A$ and $PC'_B$ related to the power consumption before and after an elapse of a predetermined time (for example, before and after an elapse of one year), and issue a warning when the change amount is greater than or equal to a predetermined value, specifically, when the change amount is greater than or equal to 1.2. Furthermore, in this case, the change amount is obtained from the actual measurement value related to the power consumption having the same parameter as the predicted value related to the power consumption for which the database has been constructed. Specifically, the display unit 17 can issue a warning indicating that aging degradation has occurred in the electrical device 20 based on a sound and an image or a video. Furthermore, when the predetermined time is short (for example, one day), the display unit 17 can issue a warning indicating that a defect or failure has occurred in the electrical device 20 or that an excessive load has been added thereto based on a sound and an image or a video.

In the power consumption management device, the power consumption management method, or the power consumption management program of the embodiment 1, a predicted value related to power consumption stored in the storage unit is obtained based on an environmental factor value (for example, ambient temperature) measured by the environmental factor measurement unit and the obtained predicted value related to the power consumption is compared to an actual measurement value related to the power consumption obtained based on a power consumption value measured by the power measurement unit without merely monitoring whether individual power consumption or a total amount exceeds a predetermined value having a fixed value. Therefore, it is possible to monitor power consumption of an electrical device with higher precision and accurately recognize defect occurrence or aging degradation of the electrical device. That is, a user or the like can not only accurately recognize a degree of degradation of the used an electrical device, and but can also simultaneously discover a use state and a defect (failure) early on, recognize a symptom thereof, and prevent the defect (failure) in advance. Furthermore, it is possible to browse a wide variety of comparisons such as a comparison between manufacturers of power consumption of an electrical device, a comparison between models, a comparison based on the production year, the presence/absence of variation even in the same model, and the like, and it is possible to objectively evaluate the reliability of catalog specs such as a degree of power saving provided by a manufacturer. The same is also true in a power consumption management system of the embodiment 3 as will be described later.

Embodiment 2

The embodiment 2 is a modification of the embodiment 1. In a power consumption management device 10B of the embodiment 2 illustrated in the conceptual diagram of FIG. 2, a power measurement unit 13, an environmental factor measurement unit 14, and a calculation/control unit 11 are arranged in an electrical device 20 or in the vicinity thereof as in the embodiment 1. On the other hand, a storage unit 42 is arranged within a computer 40 connected via a communication line 34. Then, the calculation/control unit 11 and the storage unit 42 can exchange data and information through a communication device 18 and a communication line 34.

Figure 2:
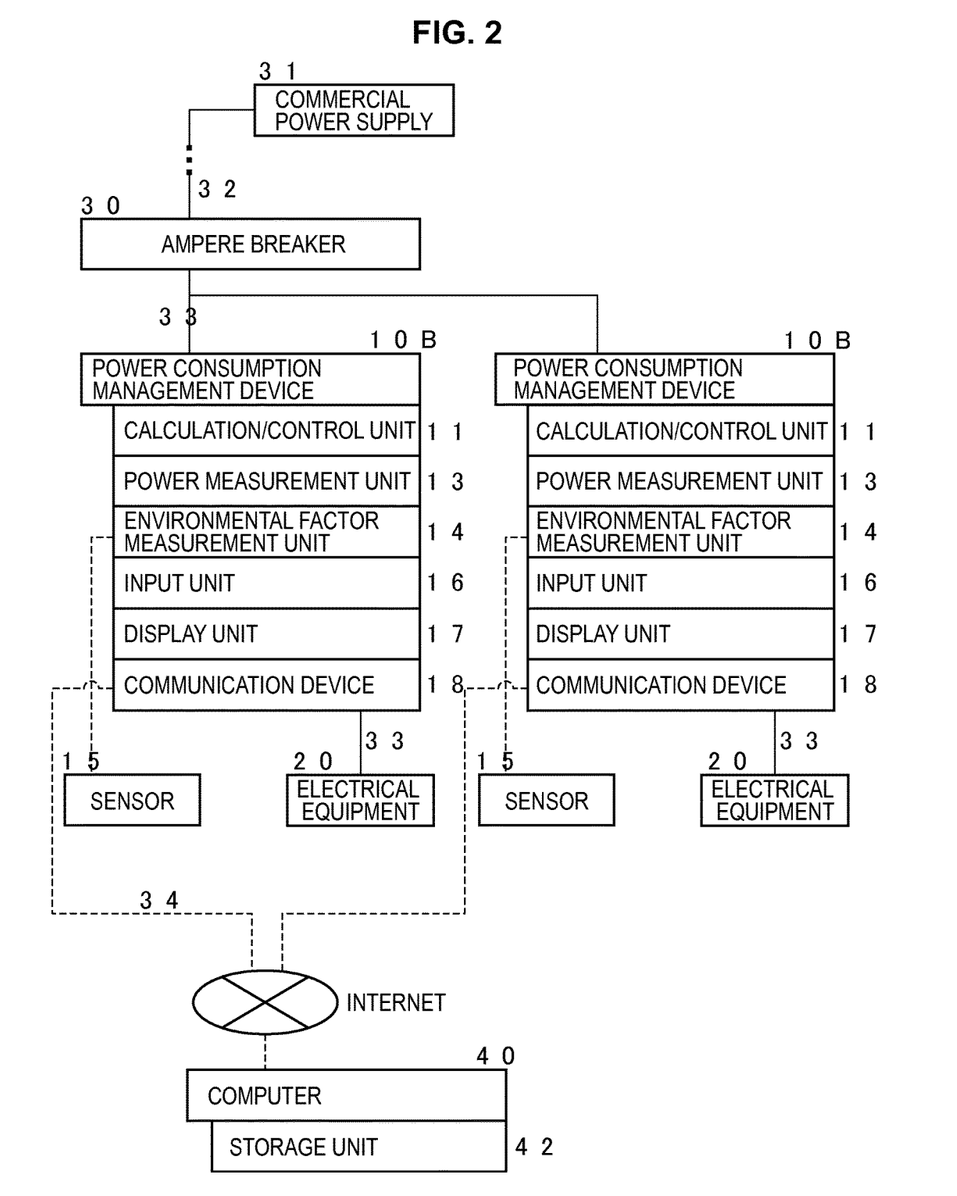
FIG. 2 is a conceptual diagram of a power consumption management device of an embodiment 2.

Because the power consumption management device 10B of the embodiment 2 can be substantially the same as the power consumption management device 10A of the embodiment 1 except for the above points and the power consumption management method or the power consumption management program can also be substantially the same as the power consumption management method or the power consumption management program of the embodiment 1, detailed description thereof is omitted.

Embodiment 3

The embodiment 3 is a modification of the embodiment 1 and relates to a power consumption management system of the present disclosure. In a power consumption management device 10C of the embodiment 3 illustrated in the conceptual diagram of FIG. 3, a power measurement unit 13 and an environmental factor measurement unit 14 are arranged in an electrical device 20 or in the vicinity thereof as in the embodiment 1. On the other hand, a storage unit 42 and a calculation/control unit 41 are arranged within a computer 40 connected via a communication line 34. Then, the power measurement unit 13, the environmental factor measurement unit 14, and the calculation/control unit 41 can exchange data and information through a communication device 18 and a communication line 34.

Figure 3:
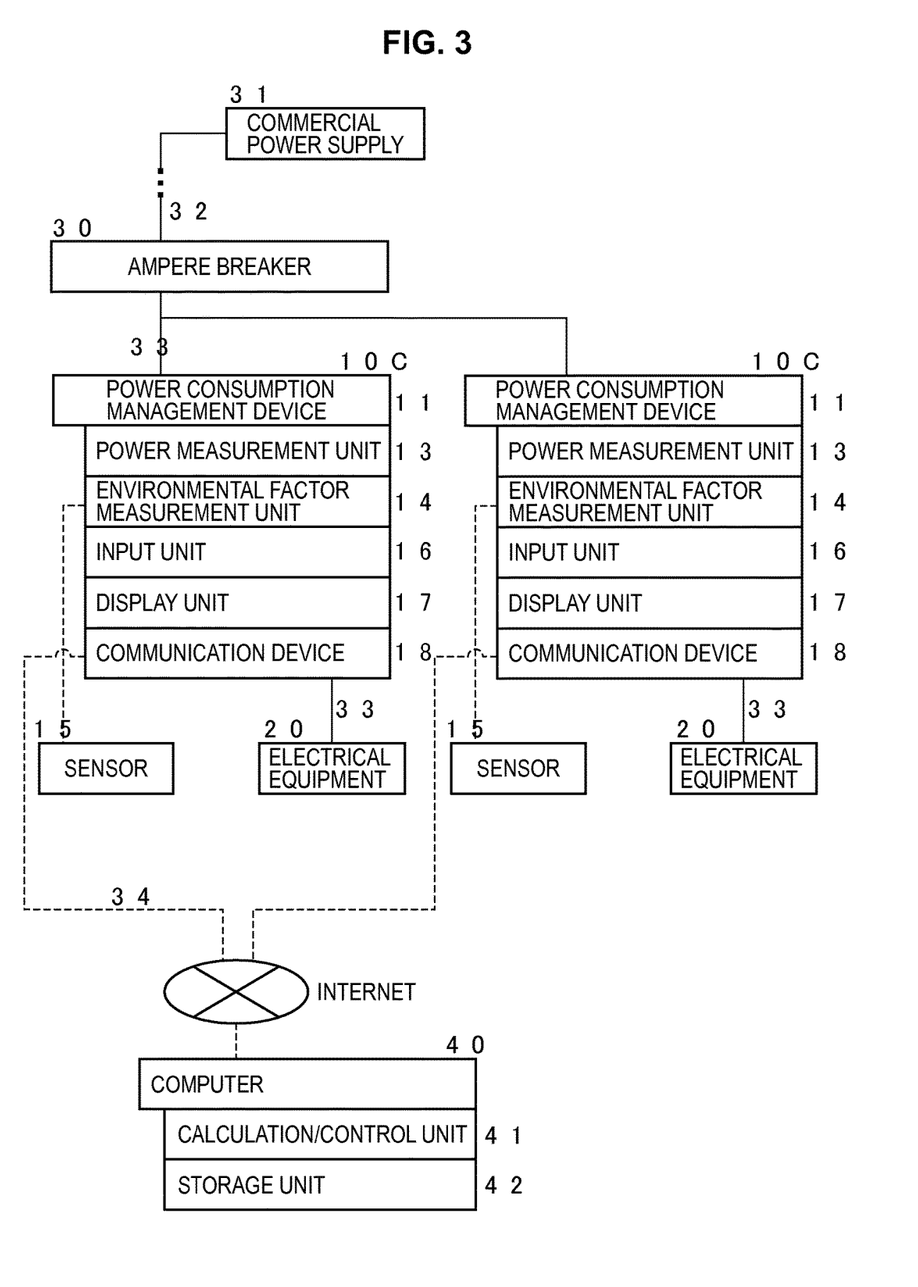
FIG. 3 is a conceptual diagram of a power consumption management device of an embodiment 3.

In addition, the power consumption management system of the embodiment 3 includes:

a plurality of power consumption management devices 10C, each of which includes the power measurement unit 13 configured to measure power consumption of the electrical device 20; and the environmental factor measurement unit 14 configured to measure a factor of an environment in which a value of the factor of the environment is designated as a parameter; and the computer 40 configured to be connected to each power consumption management device 10C via the communication line 34 and include the storage unit 42 and the calculation/control unit 41, wherein the calculation/control unit 41 obtains the predicted value related to the power consumption stored in the storage unit 42 based on the value of the factor of the environment measured by the environmental factor measurement unit 14 of each power consumption management device 10C and compares the obtained predicted value related to the power consumption to an actual measurement value related to the power consumption obtained based on a power consumption value measured by the power measurement unit 13 of the power consumption management device 10C.

The comparison result may be transmitted to the power consumption management device 10C via the communication line 34 and displayed on the display unit 17, displayed on a display device (not illustrated) provided in the computer 40, or displayed on a webpage or homepage on the Internet. In addition, the predicted value related to the power consumption stored in the storage unit 42 of the computer 40 connected via the communication line may be provided for review by the third party. Specifically, the predicted value related to the power consumption may be published on a webpage and a homepage on the Internet.

Because the power consumption management device 10C of the embodiment 3 can be substantially the same as the power consumption management device 10A of the embodiment 1 except for the above points and the power consumption management method or the power consumption management program can also be substantially the same as the power consumption management method or the power consumption management program of the embodiment 1, detailed description thereof is omitted.

Embodiment 4

The embodiment 4 is a modification of the embodiments 1 to 3. In the embodiments 1 to 3, the predicted value related to the power consumption for which a database has been constructed is not updated as a general rule. On the other hand, when a value of $\Delta PC=$[(Actual measurement value related to power consumption)−(Predicted value related to power consumption)] is in a prescribed range in the embodiment 4, the calculation/control unit 11 or 41 stores the actual measurement value related to the power consumption as the predicted value related to the power consumption in the storage unit 12 or 42 by designating the value of the factor of the environment measured by the environmental factor measurement unit 14 as the parameter.

Specifically, when $PC_{01}$ (kW·hr) as the predicted value (a predicted value of a power amount) related to the power consumption from the database stored in the storage unit 12 or 42 based on the value greater than or equal to $T_1°$ C. and less than $T_2°$ C./$A_0$/$B_0$/$C_0$ and the actual measurement value (an actual measurement value of the power amount) $PC'_A$ related to the power consumption are obtained as in the embodiment 1, the calculation/control unit 11 or 41 compares the predicted value $PC_{01}$ of the power amount to the actual measurement value $PC'_A$ of the power amount. If $\Delta PC$ is in a prescribed range $\Delta PC_{01}$ (specifically, for example, within a value ($2\sigma$) twice the standard deviation $\sigma$ of the value of the predicted value $PC_{01}$), the calculation/control unit 11 or 41 newly obtains the predicted value $PC_{01}$ by renormalizing the actual measurement value $PC'_A$ of the power amount, and stores the obtained predicted value $PC_{01}$ as a new predicted value $PC_{01}$ in the value greater than or equal to $T_1°$ C. and less than $T_2°$ C./$A_0$/$B_0$/$C_0$ in the storage unit 12 or 42. Specifically, an original predicted value and an actual measurement value are averaged and an average is stored as a new predicted value. Thereby, it is possible to perform renormalization for a population of predicted values related to the power consumption and improve the accuracy of the predicted value related to the power consumption.

Because the power consumption management device of the embodiment 4 can be substantially the same as the power consumption management device 10A of the embodiment 1 except for the above points and the power consumption management method or the power consumption management program can also be substantially the same as the power consumption management method or the power consumption management program of the embodiment 1, detailed description thereof is omitted.

Although the present disclosure has been described above based on the preferred embodiments, the present disclosure is not limited to the embodiments. The configuration and structure of the power consumption management device in the embodiment are shown as an example, and may be appropriately changed. Although the electrical device is an air conditioner in the embodiment, the electrical device is not limited thereto. Although the factor of the environment is a temperature (ambient temperature), the present disclosure is not limited thereto. When the electrical device is a washing machine or a dishwasher, the factor of the environment can include a temperature (ambient temperature) and a water temperature. When the electrical device is a clothes dryer, the factor of the environment can include an ambient temperature and a humidity. When the electrical device is a refrigerator or freezer, the factor of the environment can include an IC tag, a mass sensor, or a pressure sensor attached to content in terms of an amount of content (for example, food, drinking water, or the like) within the refrigerator or freezer.

Instead of predicted values related to power consumption as various parameters including a value of a factor of an environment as shown in the above table, values obtained by standardizing predicted values related to the power consumption as shown in the table below may be used. That is, a manufacturer of the electrical device 20 obtains a standardization coefficient $\alpha_N$ in advance instead of the predicted value related to the power consumption, and further obtains a standardized predicted value $PC_N$ related to the power consumption (a value obtained by multiplying the predicted value related to the power consumption by the standardization coefficient $\alpha_N$) and a standardized prescribed range $\Delta PC_N$ (a value obtained by multiplying the prescribed range $\Delta PC$ by the standardization coefficient $\alpha_N$) in advance. Even when the various parameters including a value of the factor of the environment are varied by standardizing the predicted value related to the power consumption, it is possible to directly compare a magnitude relation between the predicted value related to the power consumption and the actual measurement value related to the power consumption.

For example, a value of the factor (ambient temperature) of the environment measured by the environmental factor measurement unit 14 is assumed to be greater than or equal to $T_1°$ C. and less than $T_2°$ C. In addition, an operating mode $A_0$, a driving or operating condition $B_0$, and data $C_0$ of the season/month/day of month/day of week/time related to the electrical device 20 are assumed to be obtained as described in the embodiment 1. The calculation/control unit 11 or 41 can obtain $PC_{N\_01}$ (kW·hr) as a standardized predicted value related to the power consumption (a standardized predicted value of a power amount) from the database stored in the storage unit 12 or 42 based on the above-described information (the value greater than or equal to $T_1°$ C. and less than $T_2°$ C./$A_0$/$B_0$/$C_0$). On the other hand, it is possible to obtain a standardized actual measurement value (an actual measurement value of the power amount) $PC'_{N\_A}$ related to the power consumption from the power measurement unit 13 by multiplying an actual measurement value (an actual measurement value of the power amount) $PC'_A$ related to the power consumption obtained based on a power consumption value by the standardization coefficient $\alpha_{N\_01}$. Then, the calculation/control unit 11 or 41 compares the predicted value $PC_{N\_01}$ of the power amount to the actual measurement value $PC'_{N\_A}$ of the power amount. Specifically, $\Delta PC_N$ is obtained as follows.

$\Delta PC_N$=[(Standardized actual measurement value related to power consumption)−(Standardized predicted value related to power consumption)]=$PC'_{N\_A}$−$PC_{N\_01}$ Then, it is only necessary for the calculation/control unit 11 or 41 to issue a warning as described in the embodiment 1 when a value of $\Delta PC_N$ is out of a standardized prescribed range $\Delta PC_{N\_01}$.

It should be understood by those skilled in the art that various modifications, combinations, sub-combinations and alterations may occur depending on design requirements and other factors insofar as they are within the scope of the appended claims or the equivalents thereof.

Additionally, the present application may also be configured as below.

(1) <<Power Consumption Management Device>>

A power consumption management device including:

a power measurement unit configured to measure power consumption of an electrical device;

an environmental factor measurement unit configured to measure a factor of an environment in which the electrical device is used;

a storage unit configured to store a predicted value related to the power consumption in which a value of the factor of the environment is designated as a parameter; and a calculation/control unit, wherein the calculation/control unit obtains the predicted value related to the power consumption stored in the storage unit based on the value of the factor of the environment measured by the environmental factor measurement unit and compares the obtained predicted value related to the power consumption to an actual measurement value related to the power consumption obtained based on a power consumption value measured by the power measurement unit.

(2) The power consumption management device according to (1), wherein, when a value of [(Actual measurement

| Environmental factor value (ambient temperature) | Operating mode | Driving condition | Season, etc. | Standardized predicted value related to power consumption | Standardized prescribed range | Standardization coefficient |
|---|---|---|---|---|---|---|
| Greater than or equal to $T_0°$ C. and less than $T_1°$ C. | $A_0$ | $B_0$ | $C_0$ | $PC_{N\_00}$ (kW · hr) | $\Delta PC_{N\_00}$ | $\alpha_{N\_00}$ |
| Greater than or equal to $T_1°$ C. and less than $T_2°$ C. | $A_0$ | $B_0$ | $C_0$ | $PC_{N\_01}$ (kW · hr) | $\Delta PC_{N\_01}$ | $\alpha_{N\_01}$ |
| Greater than or equal to $T_2°$ C. and less than $T_3°$ C. | $A_0$ | $B_0$ | $C_0$ | $PC_{N\_02}$ (kW · hr) | $\Delta PC_{N\_02}$ | $\alpha_{N\_02}$ |
| Greater than or equal to $T_3°$ C. and less than $T_4°$ C. | $A_0$ | $B_0$ | $C_0$ | $PC_{N\_03}$ (kW · hr) | $\Delta PC_{N\_03}$ | $\alpha_{N\_03}$ |
| Greater than or equal to $T_4°$ C. and less than $T_5°$ C. | $A_0$ | $B_0$ | $C_0$ | $PC_{N\_04}$ (kW · hr) | $\Delta PC_{N\_04}$ | $\alpha_{N\_04}$ |
| Greater than or equal to $T_0°$ C. and less than $T_1°$ C. | $A_1$ | $B_0$ | $C_0$ | $PC_{N\_10}$ (kW · hr) | $\Delta PC_{N\_10}$ | $\alpha_{N\_10}$ |
| Greater than or equal to $T_1°$ C. and less than $T_2°$ C. | $A_1$ | $B_0$ | $C_0$ | $PC_{N\_11}$ (kW · hr) | $\Delta PC_{N\_11}$ | $\alpha_{N\_11}$ |
| Greater than or equal to $T_2°$ C. and less than $T_3°$ C. | $A_1$ | $B_0$ | $C_0$ | $PC_{N\_12}$ (kW · hr) | $\Delta PC_{N\_12}$ | $\alpha_{N\_12}$ |
| Greater than or equal to $T_3°$ C. and less than $T_4°$ C. | $A_1$ | $B_0$ | $C_0$ | $PC_{N\_13}$ (kW · hr) | $\Delta PC_{N\_13}$ | $\alpha_{N\_13}$ |
| Greater than or equal to $T_4°$ C. and less than $T_5°$ C. | $A_1$ | $B_0$ | $C_0$ | $PC_{N\_14}$ (kW · hr) | $\Delta PC_{N\_14}$ | $\alpha_{N\_14}$ |
| Greater than or equal to $T_0°$ C. and less than $T_1°$ C. | $A_0$ | $B_1$ | $C_0$ | $PC_{N\_20}$ (kW · hr) | $\Delta PC_{N\_20}$ | $\alpha_{N\_20}$ |
| Greater than or equal to $T_1°$ C. and less than $T_2°$ C. | $A_0$ | $B_1$ | $C_0$ | $PC_{N\_21}$ (kW · hr) | $\Delta PC_{N\_21}$ | $\alpha_{N\_21}$ |
| Greater than or equal to $T_2°$ C. and less than $T_3°$ C. | $A_0$ | $B_1$ | $C_0$ | $PC_{N\_22}$ (kW · hr) | $\Delta PC_{N\_22}$ | $\alpha_{N\_22}$ |
| Greater than or equal to $T_3°$ C. and less than $T_4°$ C. | $A_0$ | $B_1$ | $C_0$ | $PC_{N\_23}$ (kW · hr) | $\Delta PC_{N\_23}$ | $\alpha_{N\_23}$ |
| Greater than or equal to $T_4°$ C. and less than $T_5°$ C. | $A_0$ | $B_1$ | $C_0$ | $PC_{N\_24}$ (kW · hr) | $\Delta PC_{N\_24}$ | $\alpha_{N\_24}$ |
| Greater than or equal to $T_0°$ C. and less than $T_1°$ C. | $A_0$ | $B_1$ | $C_1$ | $PC_{N\_30}$ (kW · hr) | $\Delta PC_{N\_3}$ | $\alpha_{N\_30}$ |
| Greater than or equal to $T_1°$ C. and less than $T_2°$ C. | $A_0$ | $B_1$ | $C_1$ | $PC_{N\_31}$ (kW · hr) | $\Delta PC_{N\_31}$ | $\alpha_{N\_31}$ |
| Greater than or equal to $T_2°$ C. and less than $T_3°$ C. | $A_0$ | $B_1$ | $C_1$ | $PC_{N\_32}$ (kW · hr) | $\Delta PC_{N\_32}$ | $\alpha_{N\_32}$ |
| Greater than or equal to $T_3°$ C. and less than $T_4°$ C. | $A_0$ | $B_1$ | $C_1$ | $PC_{N\_33}$ (kW · hr) | $\Delta PC_{N\_33}$ | $\alpha_{N\_33}$ |
| Greater than or equal to $T_4°$ C. and less than $T_5°$ C. | $A_0$ | $B_1$ | $C_1$ | $PC_{N\_34}$ (kW · hr) | $\Delta PC_{N\_34}$ | $\alpha_{N\_34}$ | value related to power consumption)−(Predicted value related to power consumption)] is in a prescribed range, the calculation/control unit stores the actual measurement value related to the power consumption as the predicted value related to the power consumption in the storage unit by designating the value of the factor of the environment measured by the environmental factor measurement unit as the parameter.

(3) The power consumption management device according to (1) or (2), wherein, when a value of [(Actual measurement value related to power consumption)−(Predicted value related to power consumption)] is out of a prescribed range, the calculation/control unit issues a warning.

(4) The power consumption management device according to any one of (1) to (3), wherein the calculation/control unit stores the actual measurement value related to the power consumption in the storage unit, obtains a change amount between actual measurement values related to the power consumption before and after an elapse of predetermined time, and issues a warning when the change amount is greater than or equal to a predetermined value.

(5) The power consumption management device according to any one of (1) to (4), wherein the factor of the environment is at least a temperature.

(6) The power consumption management device according to any one of (1) to (5),
wherein the predicted value related to the power consumption is a predicted value of average power consumption, and
wherein the actual measurement value related to the power consumption is an actual measurement value of the average power consumption.

(7) The power consumption management device according to any one of (1) to (5),
wherein the predicted value related to the power consumption is a predicted value of a peak level of the power consumption, and
wherein the actual measurement value related to the power consumption is an actual measurement value of the peak level of the power consumption.

(8) The power consumption management device according to any one of (1) to (5),
wherein the predicted value related to the power consumption is a predicted value of a peak integration value of the power consumption, and
wherein the actual measurement value related to the power consumption is an actual measurement value of the peak integration value of the power consumption.

(9) The power consumption management device according to any one of (1) to (5),
wherein the predicted value related to the power consumption is a predicted value of a number of peak occurrences of power consumption per unit time, and
wherein the actual measurement value related to the power consumption is an actual measurement value of the number of peak occurrences of the power consumption per unit time.

(10) The power consumption management device according to any one of (1) to (9), wherein the power measurement unit, the environmental factor measurement unit, the storage unit, and the calculation/control unit are arranged in the electrical device or in the vicinity of the electrical device.

(11) The power consumption management device according to any one of (1) to (9),
wherein the power measurement unit, the environmental factor measurement unit, and the calculation/control unit are arranged in the electrical device or in the vicinity of the electrical device, and
wherein the storage unit is arranged within a computer connected via a communication line.

(12) The power consumption management device according to any one of (1) to (9),
wherein the power measurement unit and the environmental factor measurement unit are arranged in the electrical device or in the vicinity of the electrical device, and
wherein the storage unit and the calculation/control unit are arranged within a computer connected via a communication line.

(13) The power consumption management device according to any one of (1) to (12), wherein the electrical device is an air conditioner, a refrigerator, a washing machine, a heater, a television receiver, or a clothes dryer.

(14) <<Power Consumption Management System>>
A power consumption management system including:
a plurality of power consumption management devices, each of which includes
a power measurement unit configured to measure power consumption of an electrical device, and
an environmental factor measurement unit configured to measure a factor of an environment in which the electrical device is used; and
a computer configured to be connected to each power consumption management device via a communication line and include a storage unit and a calculation/control unit,
wherein the calculation/control unit obtains a predicted value related to the power consumption stored in a storage unit based on a value of the factor of the environment measured by the environmental factor measurement unit of each power consumption management device, compares the obtained predicted value related to the power consumption to an actual measurement value related to the power consumption obtained based on a power consumption value measured by the power measurement unit of the power consumption management device, and transmits a comparison result to the power consumption management device via the communication line.

(15) The power consumption management system according to (14), wherein, when a value of [(Actual measurement value related to power consumption)−(Predicted value related to power consumption)] is in a prescribed range, the calculation/control unit stores the actual measurement value related to the power consumption as the predicted value related to the power consumption in the storage unit by designating the value of the factor of the environment measured by the electrical device and the environmental factor measurement unit as a parameter.

(16) <<Power Consumption Management Method>>
A power consumption management method including:
storing a predicted value related to power consumption in which a value of a factor of an environment is designated as a parameter in a storage unit; and
obtaining the predicted value related to the power consumption stored in the storage unit based on a measurement result of the factor of the environment in which an electrical device is used and comparing the obtained predicted value related to the power consumption to an actual measurement value related to the power consumption obtained based on a power consumption measurement result of the electrical device.

(17) <<Power Consumption Management Program>>

A power consumption management program including:

storing a predicted value related to power consumption in which a value of a factor of an environment is designated as a parameter in a storage unit; and obtaining the predicted value related to the power consumption stored in the storage unit based on a measurement result of the factor of the environment in which an electrical device is used and comparing the obtained predicted value related to the power consumption to an actual measurement value related to the power consumption obtained based on a power consumption measurement result of the electrical device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power consumption management device comprising:
   a power measurement unit configured to measure an actual power consumption value of an electrical device;
   an environmental factor measurement unit configured to measure a factor of an environment in which the electrical device is used;
   a storage unit configured to store a predicted value related to the power consumption in which a value of the factor of the environment is designated as a parameter, the predicted value being based on at least one of a non-measured original predicted value and a previously measured power consumption value of the electrical device; and
   a calculation/control unit,
   wherein the calculation/control unit obtains the predicted value related to the power consumption stored in the storage unit based on the value of the factor of the environment measured by the environmental factor measurement unit, and compares the obtained predicted value to the actual power consumption value,
   wherein, when a value of [(the actual power consumption value)-(the predicted value)] is in a prescribed range, the calculation/control unit replaces the predicted value stored on the storage unit with an updated predicted value that is based on the actual power consumption value, while designating the value of the factor of the environment measured by the environmental factor measurement unit as the parameter, wherein the updated predicted value is an average of the actual power consumption value and the predicted value,
   wherein, when a value of [(the actual power consumption value)-(the predicted value)] is out of a prescribed range, the calculation/control unit issues a warning, but does not replace the predicted value stored on the storage unit with an updated predicted value, and
   wherein the warning is issued as a sound, an image displayed on a display device, or a video displayed on a display device.

2. The power consumption management device according to claim 1, wherein the calculation/control unit is configured to:
   store the actual power consumption value in the storage unit;
   obtain a change amount between measured power consumption values before and after an elapse of a predetermined time; and
   issue a warning when the change amount is greater than or equal to a predetermined value.

3. The power consumption management device according to claim 1, wherein the factor of the environment is at least a temperature.

4. The power consumption management device according to claim 1,
   wherein the predicted value is based on an estimated average power consumption, and
   wherein the actual power consumption value is based on an actual measurement value of the average power consumption.

5. The power consumption management device according to claim 1,
   wherein the predicted value is based on an estimated peak level of the power consumption, and
   wherein the actual power consumption value is based on an actual measurement value of the peak level of the power consumption.

6. The power consumption management device according to claim 1,
   wherein the predicted value is based on an estimated peak integration value of the power consumption, and
   wherein the actual power consumption value is based on an actual measurement value of the peak integration value of the power consumption.

7. The power consumption management device according to claim 1,
   wherein the predicted value is based on an estimated number of peak occurrences of power consumption per unit time, and
   wherein the actual power consumption value is based on an actual measurement value of the number of peak occurrences of the power consumption per unit time.

8. The power consumption management device according to claim 1, wherein the power measurement unit, the environmental factor measurement unit, the storage unit, and the calculation/control unit are arranged in the electrical device or in the vicinity of the electrical device.

9. The power consumption management device according to claim 1,
   wherein the power measurement unit, the environmental factor measurement unit, and the calculation/control unit are arranged in the electrical device or in the vicinity of the electrical device, and
   wherein the storage unit is arranged within a computer connected via a communication line.

10. The power consumption management device according to claim 1,
    wherein the power measurement unit and the environmental factor measurement unit are arranged in the electrical device or in the vicinity of the electrical device, and
    wherein the storage unit and the calculation/control unit are arranged within a computer connected via a communication line.

11. The power consumption management device according to claim 1, wherein the electrical device is an air conditioner, a refrigerator, a washing machine, a heater, a television receiver, or a clothes dryer.

12. The power consumption management device according to claim 1, wherein the prescribed range is twice the value of the standard deviation of the predicted value relative to the actual power consumption value.

13. The power consumption management device according to claim 1, wherein the warning is issued as a sound.

14. The power consumption management device according to claim 1, further comprising a display device, and the warning is issued as an image displayed on the display device.

15. The power consumption management device according to claim 1, further comprising a display device, and the warning is issued as a video displayed on the display device.

16. A power consumption management system comprising:
   a plurality of power consumption management devices, each of which includes
      a power measurement unit configured to measure an actual power consumption value of an electrical device, and
      an environmental factor measurement unit configured to measure a factor of an environment in which the electrical device is used; and
   a computer configured to be connected to each power consumption management device via a communication line and include a storage unit and a calculation/control unit, the storage unit configured to store a predicted value related to the power consumption in which a value of the factor of the environment is designated as a parameter, the predicted value being based on at least one of a non-measured original predicted value and a previously measured power consumption value of the electrical device,
   wherein the calculation/control unit obtains a predicted value related to the power consumption stored in a storage unit based on a value of the factor of the environment measured by the environmental factor measurement unit of each power consumption management device, compares the obtained predicted value to the actual power consumption value, and transmits a comparison result to the power consumption management device via the communication line,
   wherein, when a value of [(the actual power consumption value)−(the predicted value)] is in a prescribed range, the calculation/control unit replaces the predicted value stored on the storage unit with an updated predicted value that is based on the actual power consumption value, while designating the value of the factor of the environment measured by the environmental factor measurement unit as the parameter, wherein the updated predicted value is an average of the actual power consumption value and the predicted value,
   wherein, when a value of [(the actual power consumption value)−(the predicted value)] is out of a prescribed range, the calculation/control unit issues a warning, but does not replace the predicted value stored on the storage unit with an updated predicted value, and
   wherein the warning is issued as a sound, an image displayed on a display device, or a video displayed on a display device.

17. A power consumption management method comprising:
   measuring an actual power consumption value of an electrical device;
   storing a predicted value related to power consumption in which a value of a factor of an environment is designated as a parameter in a storage unit, the predicted value being based on at least one of a non-measured original predicted value and a previously measured power consumption value of the electrical device;
   obtaining the predicted value related to the power consumption stored in the storage unit based on a measurement result of the factor of the environment in which an electrical device is used;
   comparing the obtained predicted value to the actual power consumption value,
   wherein, when a value of [(the actual power consumption value)−(the predicted value)] is in a prescribed range, the calculation/control unit replaces the predicted value stored on the storage unit with an updated predicted value that is based on the actual power consumption value, while designating the value of the factor of the environment measured by the environmental factor measurement unit as the parameter, wherein the updated predicted value is an average of the actual power consumption value and the predicted value,
   wherein, when a value of [(the actual power consumption value)−(the predicted value)] is out of a prescribed range, the calculation/control unit issues a warning, but does not replace the predicted value stored on the storage unit with an updated predicted value, and
   wherein the warning is issued as a sound, an image displayed on a display device, or a video displayed on a display device.

18. A power consumption management program stored on a non-transitory computer readable storage medium, which when executed, causes a computer to:
   measure an actual power consumption value of an electrical device
   store a predicted value related to power consumption in which a value of a factor of an environment is designated as a parameter in a storage unit, the predicted value being based on at least one of a non-measured original predicted value and a previously measured power consumption value of the electrical device;
   obtain the predicted value related to the power consumption stored in the storage unit based on a measurement result of the factor of the environment in which an electrical device is used; and
   compare the obtained predicted value to the actual power consumption value,
   wherein, when a value of [(the actual power consumption value)−(the predicted value)] is in a prescribed range, the calculation/control unit replaces the predicted value stored on the storage unit with an updated predicted value that is based on the actual power consumption value, while designating the value of the factor of the environment measured by the environmental factor measurement unit as the parameter, wherein the updated predicted value is an average of the actual power consumption value and the predicted value,
   wherein, when a value of [(the actual power consumption value)−(the predicted value)] is out of a prescribed range, the calculation/control unit issues a warning, but does not replace the predicted value stored on the storage unit with an updated predicted value, and
   wherein the warning is issued as a sound, an image displayed on a display device, or a video displayed on a display device.

* * * * *